(12) United States Patent
Sonksen et al.

(10) Patent No.: US 7,577,772 B2
(45) Date of Patent: Aug. 18, 2009

(54) METHOD AND SYSTEM FOR OPTIMIZING DMA CHANNEL SELECTION

(75) Inventors: Bradley S. Sonksen, Rancho Santa Margarita, CA (US); Kuangfu D. Chu, Irvine, CA (US); Rajendra R. Gandhi, Laguna Niguel, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 266 days.

(21) Appl. No.: 10/935,919

(22) Filed: Sep. 8, 2004

(65) Prior Publication Data

US 2006/0053236 A1    Mar. 9, 2006

(51) Int. Cl.
*G06F 13/18* (2006.01)
*G06F 3/00* (2006.01)

(52) U.S. Cl. ............................. 710/22; 710/5
(58) Field of Classification Search ............. 710/22
See application file for complete search history.

(56) References Cited

U.S. PATENT DOCUMENTS

| | | | |
|---|---|---|---|
| 4,268,906 A | 5/1981 | Bourke et al. | |
| 4,333,143 A | 6/1982 | Calder | |
| 4,449,182 A | 5/1984 | Rubinson | |
| 4,549,263 A | 10/1985 | Calder | |
| 4,777,595 A | 10/1988 | Strecker et al. | |
| 4,783,730 A | 11/1988 | Fischer | |
| 4,783,739 A | 11/1988 | Calder | |
| 4,803,622 A | 2/1989 | Bain, Jr. et al. | |
| 5,129,064 A | 7/1992 | Fogg, Jr. et al. | |
| 5,151,899 A | 9/1992 | Thomas et al. | |
| 5,212,795 A | 5/1993 | Hendry | |
| 5,249,279 A | 9/1993 | Schmenk et al. | |

(Continued)

FOREIGN PATENT DOCUMENTS

EP        0738978        10/1996

(Continued)

OTHER PUBLICATIONS

Budruk, Ravi et al., "PCI Express System Architecture", (2004),434,436-439,442-443.

(Continued)

*Primary Examiner*—Henry W. H. Tsai
*Assistant Examiner*—Titus Wong
(74) *Attorney, Agent, or Firm*—Klein, O'Neill & Singh, LLP

(57) ABSTRACT

A host bus adapter coupled to a network and a host computing system is provided. The host bus adapter includes a direct memory access ("DMA")mode detection module that receives a DMA channel identifier information from an arbitration module that receives requests from plural DMA channels, wherein the DMA mode detection module includes a DMA counter that counts a number of times a single DMA channel is exclusively serviced by the arbitration module and if the DMA counter value is equal to a threshold value, then the DMA mode detection module enables a single channel mode during which standard transaction rules are ignored for determining DMA request lengths for transferring data. The single channel mode is enabled for a certain duration. The host bus adapter includes a rule based segmentation logic that may be enabled and/or disabled by host bus adapter firmware and/or detection of a single channel mode condition.

23 Claims, 6 Drawing Sheets

U.S. PATENT DOCUMENTS

| | | | |
|---|---|---|---|
| 5,276,807 A | 1/1994 | Kodama et al. | |
| 5,280,587 A | 1/1994 | Shimodaira et al. | |
| 5,321,816 A | 6/1994 | Rogan et al. | |
| 5,347,638 A | 9/1994 | Desai et al. | |
| 5,371,861 A | 12/1994 | Keener et al. | |
| 5,388,237 A * | 2/1995 | Sodos | 710/22 |
| 5,448,702 A | 9/1995 | Garcia, Jr. et al. | |
| 5,469,453 A | 11/1995 | Glider et al. | |
| 5,568,614 A | 10/1996 | Mendelson et al. | 709/231 |
| 5,613,162 A | 3/1997 | Kabenjian et al. | |
| 5,632,016 A | 5/1997 | Hoch et al. | |
| 5,647,057 A | 7/1997 | Roden et al. | |
| 5,664,197 A * | 9/1997 | Kardach et al. | 710/240 |
| 5,671,365 A | 9/1997 | Binford et al. | |
| 5,729,762 A * | 3/1998 | Kardach et al. | 710/22 |
| 5,740,467 A | 4/1998 | Chmielecki, Jr. et al. | |
| 5,751,965 A | 5/1998 | Mayo et al. | |
| 5,758,187 A | 5/1998 | Young | |
| 5,761,427 A | 6/1998 | Shah et al. | |
| 5,761,533 A | 6/1998 | Aldereguila et al. | |
| 5,828,856 A | 10/1998 | Bowes et al. | |
| 5,828,903 A | 10/1998 | Sethuram et al. | |
| 5,835,496 A | 11/1998 | Yeung et al. | |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | 700/2 |
| 5,960,451 A | 9/1999 | Voigt et al. | |
| 5,968,143 A | 10/1999 | Chisholm et al. | |
| 5,983,292 A | 11/1999 | Nordstrom et al. | |
| 6,006,340 A | 12/1999 | O'Connell | |
| 6,049,802 A | 4/2000 | Waggener, Jr. et al. | |
| 6,055,603 A | 4/2000 | Ofer et al. | |
| 6,078,970 A | 6/2000 | Nordstrom et al. | |
| 6,085,277 A | 7/2000 | Nordstrom et al. | |
| 6,105,122 A | 8/2000 | Muller et al. | |
| 6,115,761 A | 9/2000 | Daniel et al. | |
| 6,134,617 A | 10/2000 | Weber | |
| 6,138,176 A | 10/2000 | McDonald et al. | |
| 6,167,465 A | 12/2000 | Parvin et al. | |
| 6,185,620 B1 | 2/2001 | Weber et al. | 709/230 |
| 6,233,244 B1 | 5/2001 | Runaldue et al. | |
| 6,269,413 B1 | 7/2001 | Sherlock | |
| 6,310,884 B1 | 10/2001 | Odenwald, Jr. | |
| 6,314,477 B1 | 11/2001 | Cowger et al. | |
| 6,343,324 B1 | 1/2002 | Hubis et al. | |
| 6,397,277 B1 | 5/2002 | Kato et al. | |
| 6,408,349 B1 | 6/2002 | Castellano | |
| 6,425,021 B1 * | 7/2002 | Ghodrat et al. | 710/22 |
| 6,425,034 B1 * | 7/2002 | Steinmetz et al. | 710/305 |
| 6,434,630 B1 | 8/2002 | Micalizzi, Jr. et al. | |
| 6,457,090 B1 | 9/2002 | Young | 710/313 |
| 6,463,032 B1 | 10/2002 | Lau et al. | |
| 6,502,189 B1 | 12/2002 | Westby | 713/3 |
| 6,504,846 B1 | 1/2003 | Yu et al. | |
| 6,526,518 B1 | 2/2003 | Catlin et al. | |
| 6,538,669 B1 | 3/2003 | Lagueux et al. | |
| 6,546,010 B1 | 4/2003 | Merchant et al. | |
| 6,564,271 B2 * | 5/2003 | Micalizzi et al. | 710/39 |
| 6,594,329 B1 | 7/2003 | Susnow | |
| 6,604,224 B1 | 8/2003 | Armstrong et al. | |
| 6,636,909 B1 | 10/2003 | Kahn et al. | |
| 6,643,748 B1 | 11/2003 | Wieland | |
| 6,671,776 B1 | 12/2003 | DeKoning | |
| 6,671,832 B1 | 12/2003 | Apisdorf | |
| 6,721,799 B1 | 4/2004 | Slivkoff | 709/236 |
| 6,725,388 B1 | 4/2004 | Susnow | |
| 6,763,398 B2 | 7/2004 | Brant et al. | |
| 6,775,693 B1 | 8/2004 | Adams | |
| 6,810,440 B2 | 10/2004 | Micalizzi, Jr. et al. | |
| 6,810,442 B1 | 10/2004 | Lin et al. | |
| 6,839,747 B1 | 1/2005 | Blumenau et al. | |
| 6,871,248 B2 | 3/2005 | Riley | |
| 6,944,829 B2 | 9/2005 | Dando | |
| 7,000,025 B1 | 2/2006 | Wilson | |
| 7,051,182 B2 | 5/2006 | Blumenau et al. | |
| 7,055,014 B1 | 5/2006 | Pawlowski et al. | |
| 7,117,141 B2 | 10/2006 | Kaji et al. | |
| 7,117,304 B2 | 10/2006 | Sohn | |
| 7,155,553 B2 | 12/2006 | Lueck et al. | |
| 7,167,929 B2 | 1/2007 | Steinmetz et al. | |
| 7,171,624 B2 | 1/2007 | Baldwin et al. | |
| 7,230,549 B1 | 6/2007 | Woodral et al. | |
| 7,231,480 B2 | 6/2007 | Woodral | |
| 7,231,560 B2 | 6/2007 | Lai et al. | |
| 7,254,206 B2 | 8/2007 | Chiang | |
| 7,349,399 B1 | 3/2008 | Chen et al. | |
| 2002/0069317 A1 | 6/2002 | Chow et al. | |
| 2002/0131419 A1 | 9/2002 | Tamai | |
| 2002/0147802 A1 | 10/2002 | Murotani et al. | |
| 2003/0012200 A1 | 1/2003 | Salamat | |
| 2003/0056000 A1 | 3/2003 | Mullendore et al. | |
| 2003/0056032 A1 * | 3/2003 | Micalizzi et al. | 710/5 |
| 2003/0097481 A1 | 5/2003 | Richter | |
| 2003/0126322 A1 | 7/2003 | Micalizzi, Jr. et al. | |
| 2003/0161429 A1 | 8/2003 | Chiang | |
| 2003/0236953 A1 | 12/2003 | Grieff et al. | |
| 2004/0042458 A1 | 3/2004 | Elzu | |
| 2004/0073862 A1 | 4/2004 | Armstrong et al. | |
| 2004/0107389 A1 | 6/2004 | Brown et al. | |
| 2004/0267982 A1 | 12/2004 | Jackson et al. | |
| 2005/0025152 A1 | 2/2005 | Georgiou et al. | |
| 2005/0058148 A1 | 3/2005 | Castellano et al. | |
| 2005/0093575 A1 | 5/2005 | Schoenborn et al. | |
| 2005/0104623 A1 | 5/2005 | Guo et al. | |
| 2005/0141661 A1 | 6/2005 | Renaud et al. | |
| 2005/0286526 A1 | 12/2005 | Sood et al. | |
| 2006/0095607 A1 | 5/2006 | Lim et al. | |
| 2006/0123298 A1 | 6/2006 | Tseng | |
| 2006/0129733 A1 | 6/2006 | Sobelman | |
| 2006/0156083 A1 | 7/2006 | Jang et al. | |
| 2006/0209735 A1 | 9/2006 | Evoy | |
| 2006/0253757 A1 | 11/2006 | Brink et al. | |
| 2007/0011534 A1 | 1/2007 | Boudon et al. | |
| 2007/0124623 A1 | 5/2007 | Tseng | |
| 2007/0177701 A1 | 8/2007 | Thanigasalam | |
| 2007/0262891 A1 | 11/2007 | Woodral et al. | |

FOREIGN PATENT DOCUMENTS

| | | |
|---|---|---|
| EP | 1059588 | 12/2000 |
| WO | WO 95/06286 | 3/1995 |
| WO | WO 00/58843 | 10/2000 |

OTHER PUBLICATIONS

"PCI Express Base Specification Revision 1.0", (Apr. 29, 2002), 195-196.

"PCI Express Base Specification Revision 1.0", *PCI-SIG,* (Apr. 29, 2003),183, 184, 199-201.

"PCI Express Base Specification Revision 1.0a", *PCI-SIG,* (Apr. 15, 2003),171, 172, 204 & 205.

Houghton Mifflin Company, "Definition of the term "network", Source: The American Heritage College Dictionary", Fourth Edition, (2002),934.

"Fibre Channel Framing and Signaling (FC-FS) Rev. 1.10", *American National Standards Institute, Inc.(ANSI)*, retrieved from the internet on Nov. 15, 2007 at ftp://ftp.t11.org/t11/pub/fc/fs/01-024v1.pdf,(Jan. 25, 2001),319-320.

"Examination Report from the European Patent Office dated Jul. 5, 2007 for European Application No. 05 794 988.5".

"Office Action from the USPTO dated Jan. 4, 2008 for U.S. Appl. No. 11/039,189".

"Office Action from USPTO dated Apr. 6, 2007 for U.S. Appl. No. 10/956,718".

"Office Action from USPTO dated Aug. 30, 2007 for U.S. Appl. No. 11/746,486".

"Office Action from USPTO dated May 23, 2008 for U.S. Appl. No. 10/948,404".

"Notice of Allowance from USPTO dated Apr. 9, 2008 for U.S. Appl. No. 11/039,189".

"Office Action from USPTO dated Jun. 9, 2008 for U.S. Appl. No. 11/099,751".

"Office Action from USPTO dated May 27, 2008 for U.S. Appl. No. 10/956,955".

"Office Action from State intellectual Property Office of China dated May 23, 2008 for Chinese Applicationi No. 2005800345862".

"Final Office Action from USPTO dated Dec. 2, 2008 for U.S. Appl. No. 10/956,955".

"Final Office Action from USPTO dated Dec. 2, 2008 for U.S. Appl. No. 10/948,404".

"Final Office Action from USPTO dated Jan. 27, 2009 for U.S. Appl. No. 11/099,751".

"Notice of Allowance from European Patent Office dated Oct. 22, 2008 for European Application No. 05794988.5".

* cited by examiner

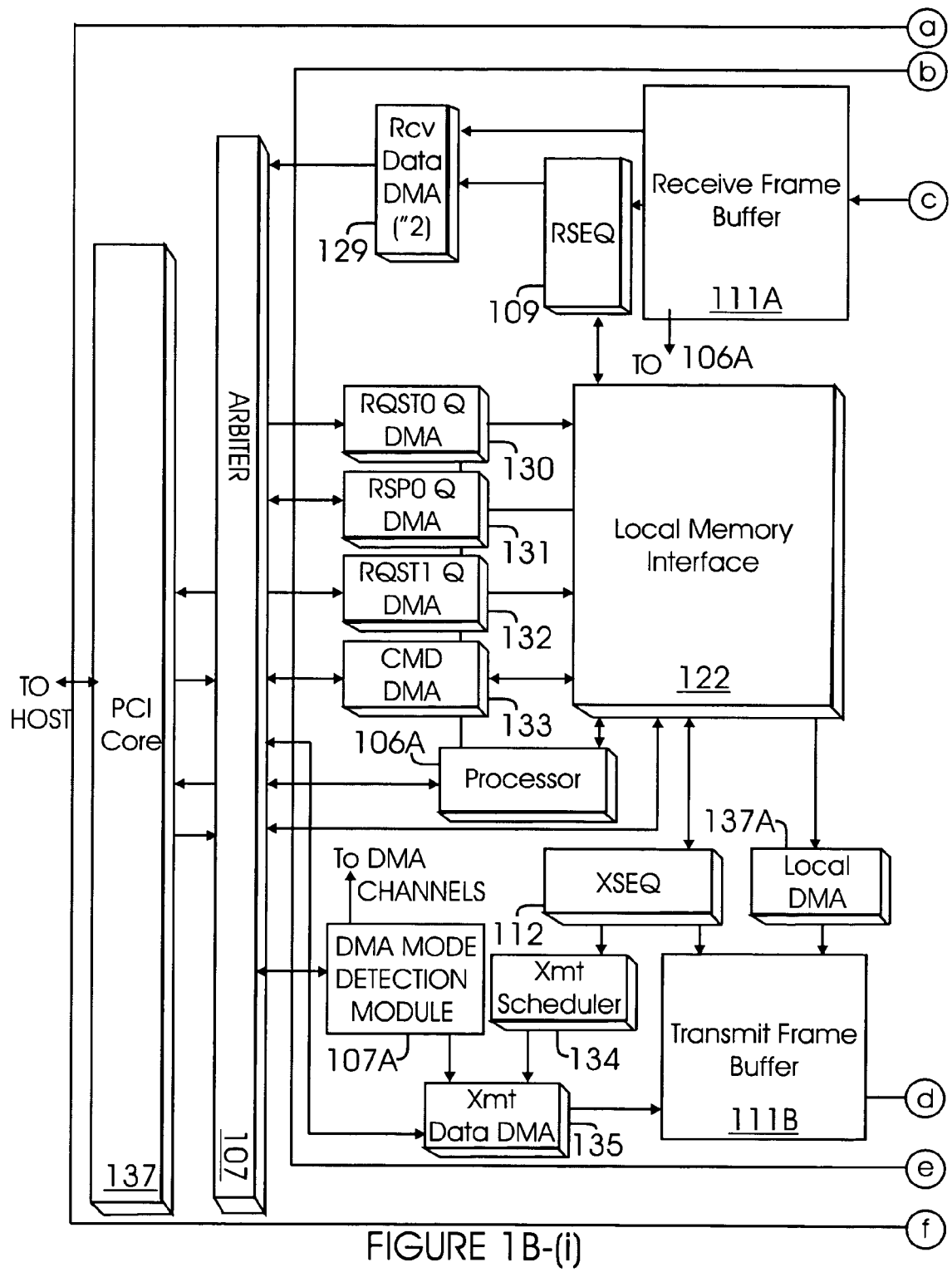
FIGURE 1B-(i)

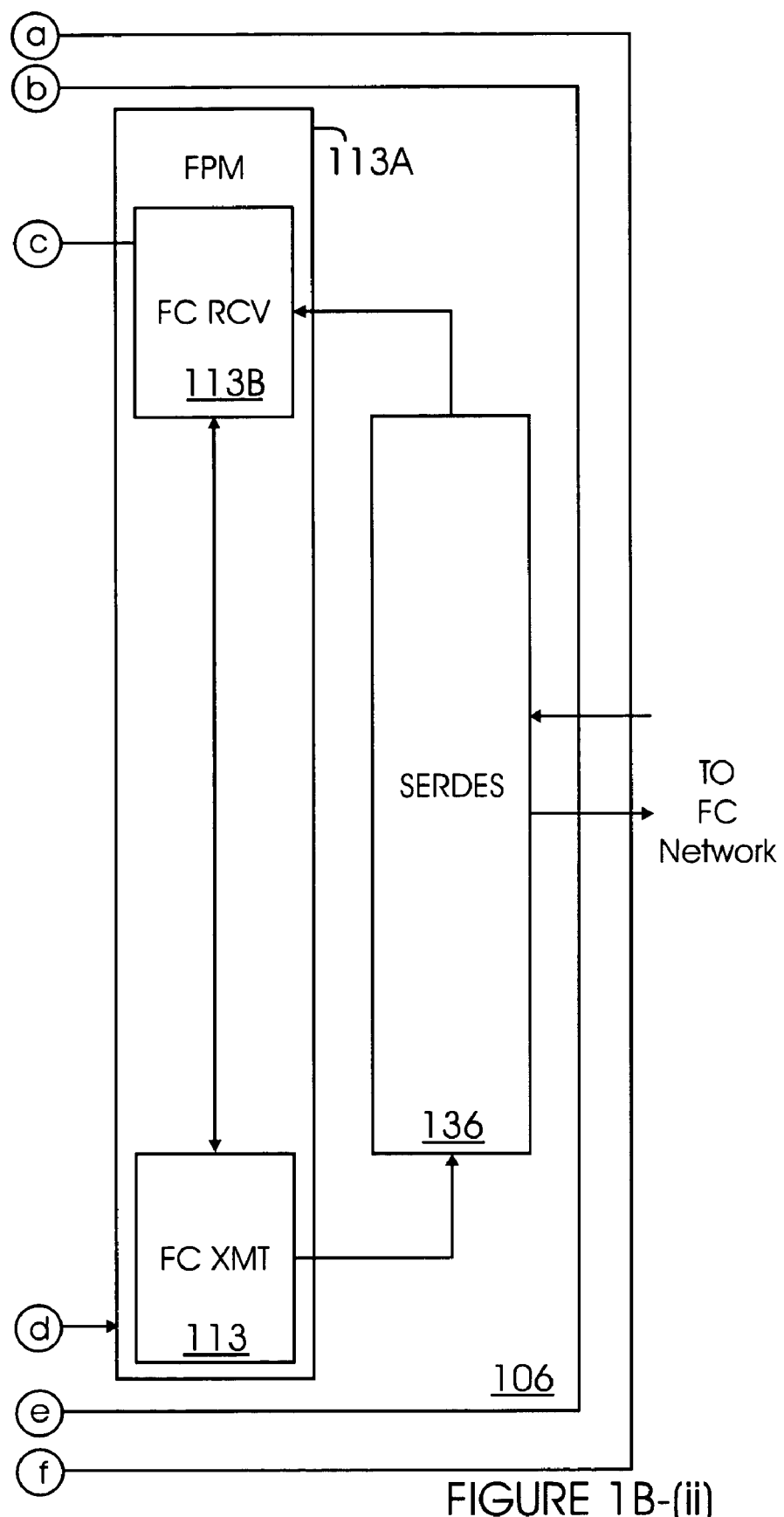
FIGURE 1B-(ii)

METHOD AND SYSTEM FOR OPTIMIZING DMA CHANNEL SELECTION

BACKGROUND

1. Field of the Invention

The present invention relates to computing systems, and more particularly to optimizing direct memory access ("DMA") channel arbitration.

2. Background of the Invention

Storage area networks ("SANs") are commonly used where plural memory storage devices are made available to various host computing systems. Data in a SAN is typically moved from plural host systems (that include computer systems, servers etc.) to the storage system through various controllers/adapters.

Host systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is another standard bus that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

Various other standard interfaces are also used to move data from host systems to storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others. Fibre channel provides an input/output interface to meet the requirements of both channel and network users.

iSCSI is another standard (incorporated herein by reference in its entirety) that is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

DMA modules are used by HBAs to perform data transfers between memory locations, or between memory locations and an input/output port. A DMA module functions without involving a microprocessor by initializing control registers in the DMA unit with transfer control information. The transfer control information generally includes source address (the address of the beginning of a block of data to be transferred), the destination address, and the size of the data block. DMA units provide address and bus control signals to and from a device for a read and/or write cycle.

Specific channels are implemented in a DMA unit to allow storage devices to transfer data directly to and from memory storage devices. A channel can be activated by a DMA request signal (DREQ) from a storage device or a host system. The DMA unit receives the DREQ, provides a DMA acknowledged signal (DACK), and transfers the data over the channel to or from the storage device.

HBAs typically use multiple DMA channels and have an arbitration module that arbitrates for access to the PCI (or PCI-Express) link. This allows an HBA to arbitrate and switch contexts (between channels) by actively processing command, status and data. Multiple channels are serviced in periodic bursts. After each arbitration cycle there is additional time for re-loading a data pipeline when connecting to selected channel, even if the selected channel is the same as the previously selected channel in the previous arbitration cycle. Hence if multiple channels are not being used, the minimum arbitration cycle adds latency (of plural clock cycles) and affects overall performance. The reason for the latency is that certain resources have to be loaded and updated for every DMA cycle. When consecutive requests occur from the same DMA channel and no other channel is requesting access, there is an additional penalty each time the same channel is serviced because no data is transferred by another channel during the time when the active channel is re-initialized (or "re-armed").

A HBA often has to perform frequent context switching between DMA channels, especially when status, command and data are processed at the same time. In other instances, the HBA may operate using predominantly a single DMA channel. This occurs for example, where a large data transfer occurs and a particular DMA unit gets access. These instances (i.e. single channel use or frequent context switching) are not predictable. Conventional HBAs fail to auto-sense single channel usage and adjust arbitration cycles accordingly.

Also, industry standards (for example, PCI-Express standard) provide transaction rules as to when memory read/write requests must terminate based on maximum payload, maximum read request size and address/data alignment. Because of these rules, a large DMA request may have to be segmented into smaller blocks. In conventional systems, completion for a first data segment is received before another request is granted for the next segment to the same DMA channel. This is because only one outstanding request per DMA channel is allowed. The request-response sequence is repeated until the entire DMA request is completed. If a single channel is repeatedly used for a large data transfer, the request-response-request cycle negatively affects overall performance.

Therefore, what is required is a system and method that can automatically sense if the same DMA channel is being used for a data transfer, disable certain standard request and segmentation rules for a certain period and efficiently transfer data by decreasing arbitration frequency.

SUMMARY OF THE INVENTION

In one aspect of the present invention, a host bus adapter coupled to a network and a host computing system is provided. The host bus adapter includes a direct memory access ("DMA")mode detection module that receives a DMA channel identifier information from an arbitration module that receives requests from plural DMA channels, wherein the DMA mode detection module includes a DMA counter that counts a number of times a single DMA channel is exclusively serviced by the arbitration module and if the DMA counter value is equal to a threshold value, then the DMA mode detection module enables a single channel mode during which standard transaction rules are ignored for determining DMA request lengths for transferring data. The single channel mode is enabled for a certain duration.

The host bus adapter includes a rule based segmentation logic that may be enabled and/or disabled by host bus adapter firmware and/or detection of a single channel mode condition.

The DMA mode detection module includes a register that stores the threshold value and the threshold value is programmable. The plural DMA channels include a DMA channel in a receive and transmit path of the host bus adapter.

In another aspect of the present invention, a system that allows a host computing system to communicate with plural devices over a network is provided. The system includes a host bus adapter including a DMA mode detection module that receives a DMA channel identifier information from an arbitration module that receives requests from plural DMA channels, wherein the DMA mode detection module includes a DMA counter that counts a number of times a single DMA channel is exclusively serviced by the arbitration module and if the DMA counter value is equal to a threshold value, then the DMA mode detection module enables a single channel mode during which standard transaction rules are ignored for determining DMA request lengths for transferring data.

The host bus adapter includes a rule based segmentation logic that may be enabled and/or disabled by host bus adapter firmware and/or detection of a single channel mode condition.

The DMA mode detection module includes a register that stores the threshold value and the threshold value is programmable.

A host computing system that can communicate with plural devices over a network is provided. The computing system is coupled to a host bus adapter that includes a DMA mode detection module that receives a DMA channel identifier information from an arbitration module that receives requests from plural DMA channels, wherein the DMA mode detection module includes a DMA counter that counts a number of times a single DMA channel is exclusively serviced by the arbitration module and if the DMA counter value is equal to a threshold value, then the DMA mode detection module enables a single channel mode during which standard transaction rules are ignored for determining DMA request lengths for transferring data.

The host bus adapter includes a rule based segmentation logic that may be enabled and/or disabled by host bus adapter firmware and/or detection of a single channel mode condition.

In yet another aspect of the present invention, a method for transferring data between a host computing system and plural devices using a HBA is provided. The method includes, determining if a same DMA channel in the HBA has been exclusively serviced for a certain duration; and enabling a single channel mode during which standard transaction rules are ignored for determining DMA request lengths for transferring data between the host computing system and the plural devices.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1B is a block diagram of a host bus adapter that uses DMA mode selection, according to one aspect of the present invention;

The use of similar reference numerals in different figures indicates similar or identical items.

DETAILED DESCRIPTION OF THE PREFERRED EMBODIMENTS

To facilitate an understanding of the preferred embodiment, the general architecture and operation of a SAN, and a HBA will be described. The specific architecture and operation of the preferred embodiment will then be described with reference to the general architecture of the host system and HBA.

Figure 1A:
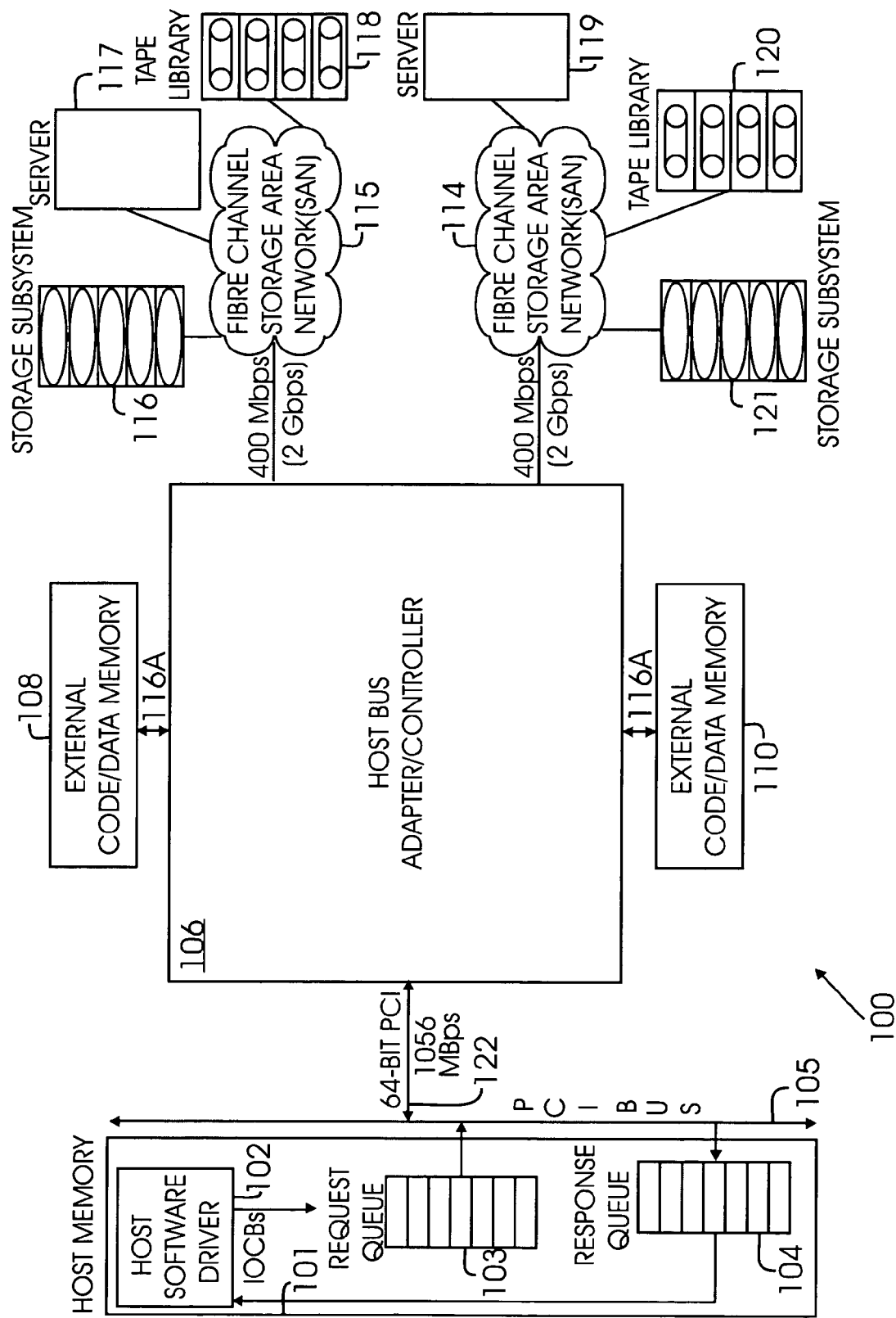
FIG. 1A is a block diagram showing various components of a SAN.

SAN Overview:

FIG. 1A shows a SAN system 100 that uses a HBA 106 (referred to as adapter 106) for communication between a host system with host memory 101 to various storage systems (for example, storage subsystem 116 and 121, tape library 118 and 120) using fibre channel storage area networks 114 and 115. Host memory 101 includes a driver 102 that co-ordinates all data transfer via adapter 106 using input/output control blocks ("IOCBs"). Servers 117 and 119 can also access the storage sub-systems using SAN 115 and 114, respectively.

A request queue 103 and response queue 104 is maintained in host memory 101 for transferring information using adapter 106. Host system communicates with adapter 106 via a PCI bus 105 through a PCI core module (interface) 137, as shown in FIG. 1B.

HBA 106:

FIG. 1B shows a block diagram of adapter 106. Adapter 106 includes processors (may also be referred to as "sequencers") "XSEQ" 112 and "RSEQ" 109 for receive and transmit side, respectively for processing data received from storage sub-systems and transmitting data to storage sub-systems. Transmit path in this context means data path from host memory 101 to the storage systems via adapter 106. Receive path means data path from storage subsystem via adapter 106. It is noteworthy, that only one processor is used for receive and transmit paths, and the present invention is not limited to any particular number/type of processors. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113A that includes an FPM 113B and 113 in receive and transmit paths, respectively. FPM 113B and FPM 113 allow data to move to/from storage systems.

Adapter 106 is also coupled to external memory 108 and 110 via connection 116A (FIG. 1A) (referred interchangeably, hereinafter) and local memory interface 122. Memory interface 122 is provided for managing local memory 108 and 110. Local DMA module 137A is used for gaining access to move data from local memory (108/110).

Adapter 106 also includes a serial/de-serializer 136 for converting data from 10-bit to 8-bit format and vice-versa.

Adapter 106 also includes request queue (0) DMA channel 130, response queue DMA channel 131, request queue (1) DMA channel 132 that interface with request queue 103 and response queue 104; and a command DMA channel 133 for managing command information. These DMA channels are coupled to arbiter 107 that receives plural requests from DMA channels and grants access to a certain channel.

Both receive and transmit paths have DMA modules 129 and 135 that are used to gain access to a channel for data transfer in the receive/transmit paths. Transmit path also has a scheduler 134 that is coupled to processor 112 and schedules transmit operations.

A host processor (not shown) sets up shared data structures in buffer memory 108. A host command is stored in buffer 108 and the appropriate sequencer (i.e., 109 or 112) is initialized to execute the command.

Various DMA units (or channels, used interchangeably throughout this specification) (for example, 129, 130, 131, 132, 133 and 135) send a request to arbiter 107. The requests are analyzed based on established standard arbitration rules. When a request is granted, the DMA unit is informed of the grant and memory access is granted to a particular channel.

DMA Mode Selection Module 107A ("Module 107A")

In one aspect of the present invention, a DMA mode selection module 107A is provided that automatically detects ("auto-senses") when a particular DMA channel is being granted consecutive (i.e. back-to-back) access for a certain period of time. Module 107A can enable a "single channel" mode that circumvents various standard rules, for example, turn-off data block segmentation, which reduces the number of arbitration cycles and the turnaround time spent for the same DMA channel to be re-initialized.

Module 107A also senses when multiple channels are being used again after a single channel mode is enabled. When this occurs, the single channel mode is disabled and standard segmentation techniques are used for a large data transfer.

Figure 1C:
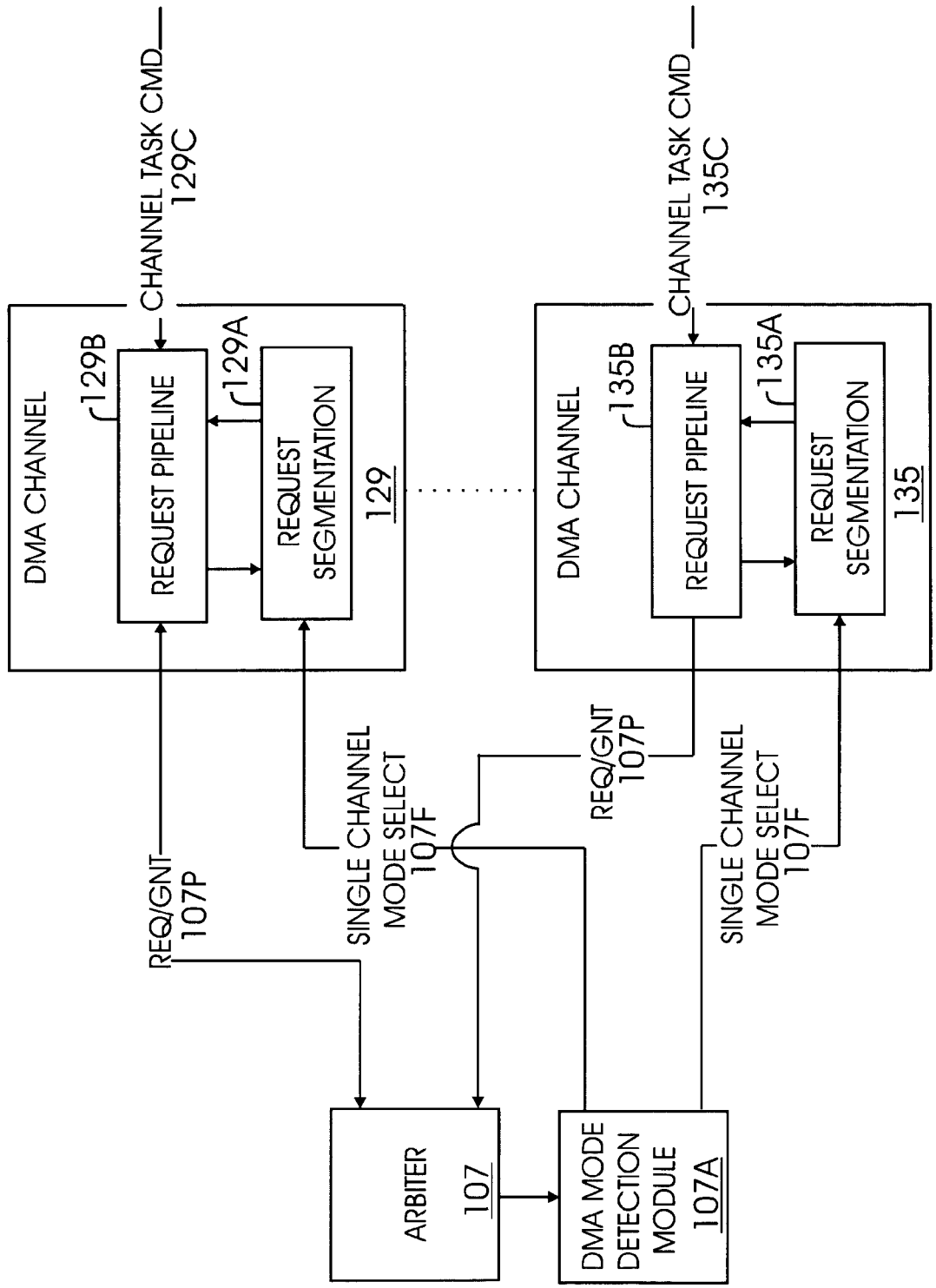
FIG. 1C shows a block diagram of plural DMA units using a DMA mode selection module, according to one aspect of the present invention.

FIG. 1C shows arbiter 107 being functionally coupled with module 107A. Plural DMA channels (for example, 129 and 135) are coupled with arbiter 107. Each DMA channel has a request pipeline (for example, 129B and 135B) and a segmentation module (for example 129A and 135A). The segmentation module segments a DMA transfer into segments (or blocks) to meet data transfer rules and/or if a DMA transfer is too large. Sequencer 109 and 112 send channel task commands (129C and 135C) to DMA channels 129 and 135, respectively. The commands are used to generate a request to arbiter 107.

Segmentation modules 129A and 135B also operate based on certain rules, for example, when and how data blocks should be segmented. These rules can be turned on or off by the firmware. Some of these rules are based on data block length and address limitations as imposed by the PCI-Express standard protocol. Rules may also be enabled/disabled by detection of a single channel mode condition that is described below.

When a channel is granted access, the information is passed on to module 107A. If the same channel is being granted access repeatedly and there are no competing requests, module 107A enables a single channel mode select signal 107F. This allows segmentation module to stop segmenting data blocks (and/or divide data blocks into larger segments) and transfer data in larger blocks to avoid arbitration cycle. The single channel mode is enabled for a finite time only so that once other channel request access, then there is no backlog.

Figure 1D:
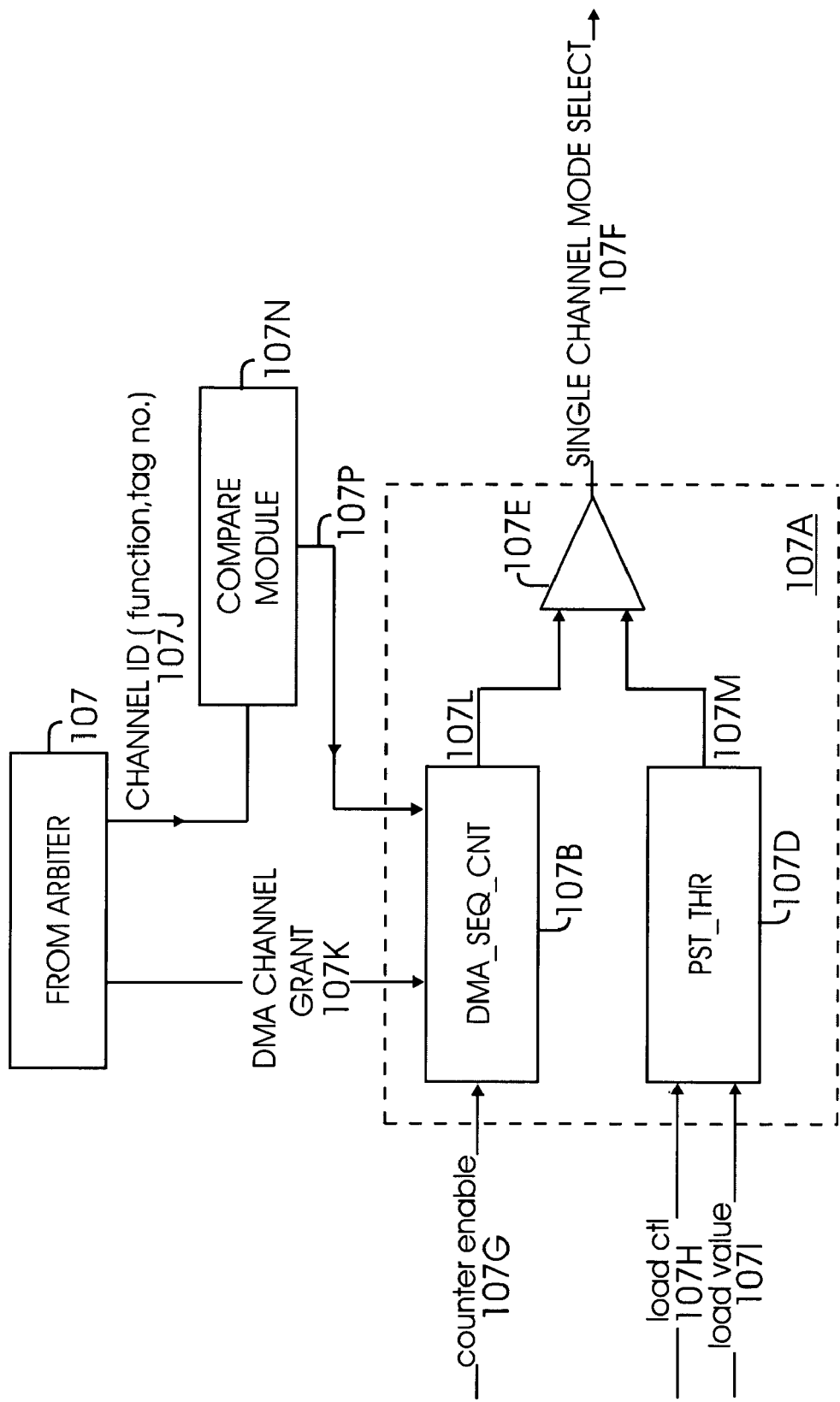
FIG. 1D shows a block diagram of the DMA mode selection module, according to one aspect of the present invention.

FIG. 1D shows a block diagram for module 107A. Module 107A's auto-sensing mode can be enabled or disabled by adapter 106 firmware. Arbiter 107 provides a channel's identifier ("Channel ID") 107J every time access is granted to a channel. A threshold register (shown as PST_THR) 107D can be programmed by firmware with a persistence threshold value. Register 107D is controlled by firmware using signal/command 107H. Command/signal 107I is used to load the threshold value.

A DMA sequence counter 107B (DMA_SEQ_CNT) maintains a running count each time a DMA request is granted by arbiter 107 (shown as 107K). Counter 107B is enabled by firmware using command/signal 107G. Compare module 107N compares the Channel ID of a current DMA request with the Channel ID 107J. If the DMA channel ID 107J is the same for a current channel (107P) as for the last channel and counter 107B value (i.e. 107L) is less than register 107D value (i.e., 107M) as determined by logic 107E, then counter 107B is increased. If the Channel ID 107J is different then counter 107B is reset, for example, 1. When 107L is equal to or greater than 107M, then the single mode select signal 107F is generated and sent to segmentation logic (for example, 129A or 135A).

Figure 2:
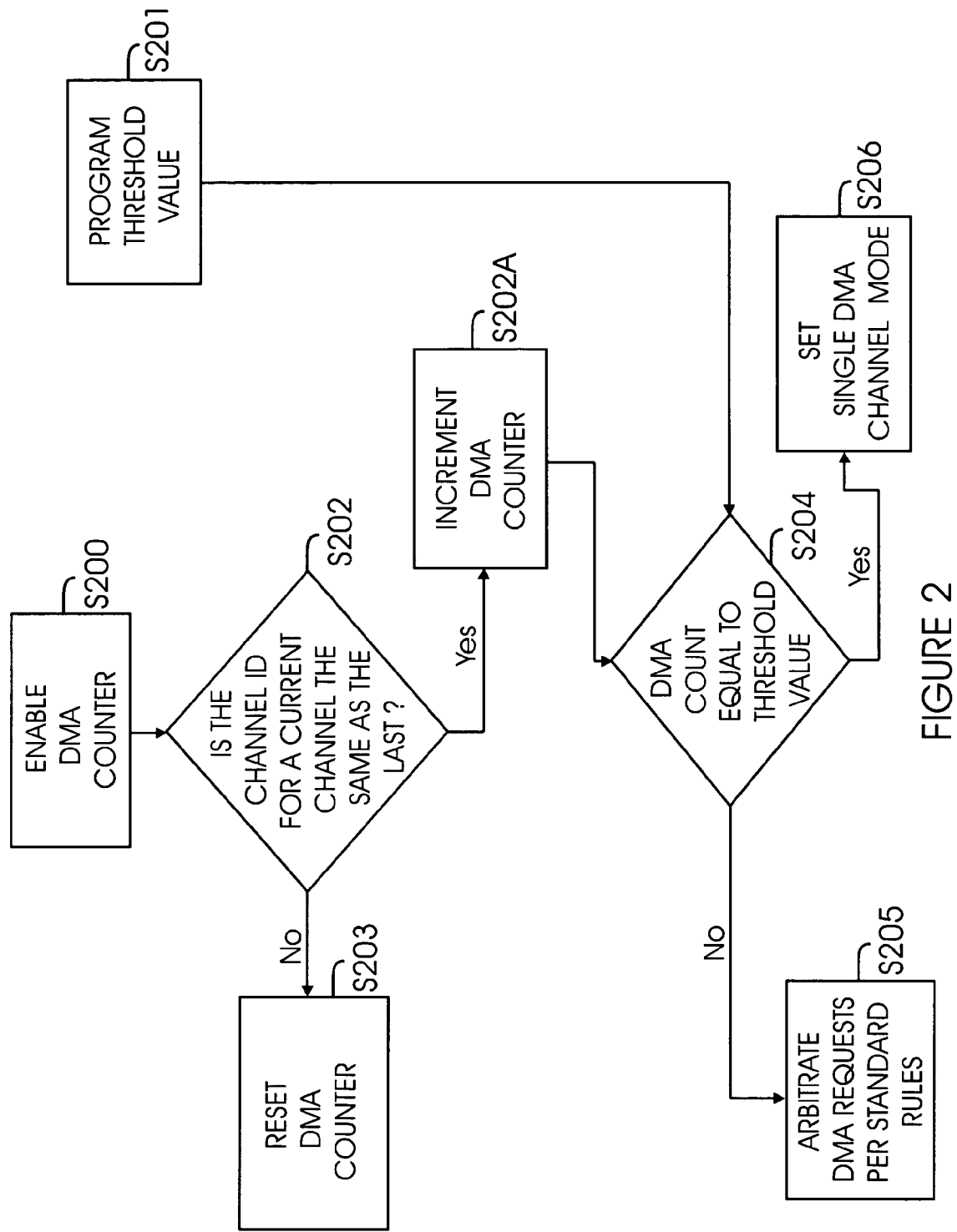
FIG. 2 is a process flow diagram of executable steps for DMA processing, according to one aspect of the present invention.

FIG. 2 shows a flow diagram of executable process steps for auto-sensing DMA channel usage and enable a single channel mode.

The process starts when counter 107B is enabled by firmware in step S200 by command/signal 107G and in step S201, a threshold value is loaded in register 107D by command/signal 107I.

In step S202, the process determines if a current DMA channel ID (107P) is the same as the Channel ID for the previous request (107J). This is performed by compare module 107N. If the Channel ID is different, then in step S203 counter 107B is reset.

If the Channel ID is the same, signifying that the same DMA channel is being serviced, then in step S202A, the DMA counter 107B is incremented.

In step S204, counter value 107L is compared with threshold value 107M by logic 107E. If 107L is not equal to 107M, then DMA requests are arbitrated and data blocks segmented using standard rules, and counter 107B is increased in step S205.

If 107L is equal to 107M, then in step S206 the single DMA channel mode is enabled. When single channel mode is not enabled then certain transaction rules are followed. For example, (a) Read requests must not exceed the maximum read request size;

(b) Write requests must not exceed the maximum payload size;

(c) Read and write requests must not overlap 4 kilo byte ("KB") address segments; and/or (d) Write requests must terminate at 128 Byte ("B") boundaries as often as possible (i.e., unless a last request in a sequence that does not end at a 128B address).

If 107L is equal to 107M, then the single channel mode is enabled by command/signal 107F.

When single channel mode is enabled, the foregoing transaction rules are not used to determine the beginning and the end of each DMA request. This will cause the arbitration frequency to decrease since the size of transfers will increase.

It is noteworthy that single channel mode may only be allowed for a certain duration by firmware of adapter 106. Normal request length segmentation/arbitration occurs after single channel mode is automatically disabled.

Although the present invention has been described with reference to specific embodiments, these embodiments are illustrative only and not limiting. Many other applications and embodiments of the present invention will be apparent in light of this disclosure and the following claims.

What is claimed is:

1. A host bus adapter coupled to a network and a host computing system, comprising:
   a plurality of direct memory access ("DMA") channels, each DMA channel identified by a unique identifier;
   an arbitration module that receives requests from the plurality of DMA channels for accessing a bus; wherein the arbitration module arbitrates between the requests and grants access to one of the plurality of DMA channels; and
   a direct memory access ("DMA") mode detection module that receives the unique identifier of a first DMA channel that is granted access by the arbitration module at any given time;
   wherein the DMA mode detection module compares the unique identifier of the first DMA channel with a unique identifier from a previous request that was granted immediately before the first DMA channel grant; and if the unique identifiers match, then the DMA mode detection module increments a DMA counter value that maintains a count value for the DMA channel that has been consecutively granted access within a certain duration;
   wherein the DMA mode detection module compares the incremented DMA counter value with a pre-programmed threshold value;
   and if the incremented DMA counter value is at least equal to the pre-programmed threshold value and no other request from another DMA channel from among the plurality of DMA channels is pending, then the DMA mode detection module enables a single channel mode to transfer data for a certain duration; and during the single channel mode, standard transaction rules are ignored to determine DMA request lengths to transfer the data; and wherein the single channel mode is disabled when the DMA mode detection module detects a pending DMA request from another DMA channel besides the first DMA channel that was not granted access to the bus within the certain duration.

2. The host bus adapter of claim 1, wherein the DMA mode detection module includes a register that stores the pre-programmed threshold value and the threshold value is programmed using host bus adapter firmware.

3. The host bus adapter of claim 1, wherein the plurality of DMA channels include a DMA channel in a receive path of the host bus adapter.

4. The host bus adapter of claim 1, wherein the plurality of DMA channels include a DMA channel in a transmit path of the host bus adapter.

5. The host bus adapter of claim 1 wherein an auto-sensing mode for the DMA mode detection module is enabled and disabled by firmware code executed by the host bus adapter; and wherein during the auto-sensing mode, the DMA detection module detects when the first DMA channel is the only DMA channel from among the plurality of DMA channels that is consecutively granted access to the bus within the certain duration.

6. The host bus adapter of claim 1, further comprising:
   a rule based segmentation logic that is disabled after detection of a single channel mode condition by the DMA mode detection module the rule based segmentation logic is enabled when the DMA mode detection module detects if another DMA channel from among the plurality of DMA channels, besides the first DMA channel, is requesting bus access.

7. A system for communication between a host computing system and a plurality of devices over a network, comprising:
   a host bus adapter including:
   a plurality of direct memory access ("DMA") channels, each DMA channel identified by a unique identifier;
   an arbitration module that receives requests from the plurality of DMA channels for accessing a bus; wherein the arbitration module arbitrates between the requests and grants access to one of the plurality of DMA channels; and
   a direct memory access ("DMA") mode detection module that receives the unique identifier of a first DMA channel that is granted access by the arbitration module at any given time;
   wherein the DMA mode detection module compares the unique identifier of the first DMA channel with a unique identifier from a previous request that was granted immediately before the first DMA channel grant; and if the unique identifiers match, then the DMA mode detection module increments a DMA counter value that maintains a count value for the DMA channel that has been consecutively granted access within a certain duration;
   wherein the DMA mode detection module compares the incremented DMA counter value with a pre-programed threshold value; and if the incremented DMA counter value is at least equal to the pre-programmed threshold value and no other request from another DMA channel from among the plurality of DMA channels is pending, then the DMA mode detection module enables a single channel mode to transfer data for a certain duration; and during the single channel mode, standard transaction rules are ignored to determine DMA request lengths to transfer the data; and wherein the single channel mode is disabled when the DMA mode detection module detects a pending DMA request from another DMA channel besides the first DMA channel that was not granted access to the bus within the certain duration.

8. The system of claim 7, wherein the DMA mode detection module includes a register that stores the pre-programmed threshold value and the threshold value is programmed using host bus adapter firmware.

9. The system of claim 7, wherein the plurality of DMA channels include a DMA channel in a receive path of the host bus adapter.

10. The system of claim 7, wherein the plurality of DMA channels include a DMA channel in a transmit path of the host bus adapter.

11. The system of claim 7, wherein an auto-sensing mode for the DMA mode detection module is enabled and disabled by firmware code executed by the host bus adapter; and wherein during the auto-sensing mode, the DMA detection module detects when the first DMA channel is the only DMA channel from among the plurality of DMA channels that is consecutively granted access to the bus within the certain duration.

12. The system of claim 7, wherein the network is based on fibre channel.

13. The system of claim 7, wherein the host bit adapter includes a rule based segmentation logic that is disabled after detection of a single channel mode condition by the DMA mode detection module and enabled when the DMA mode detection module detects if another DMA channel from among the plurality of DMA channels, besides the first DMA channel is requesting bus access.

14. A host computing system communicating with a plurality of devices over a network, comprising:
   a host bus adapter operationally coupled to the host computing system includes:
   a plurality of direct memory access ("DMA ") channels, each DMA channel identified by a unique identifier;
   an arbitration module that receives requests from the plurality of DMA channels for accessing a bus; wherein the arbitration module arbitrates between the requests and grants access to one of the plurality of DMA channels; and
   a direct memory access ("DMA") mode detection module that receives the unique identifier of a first DMA channel that is granted access by the arbitration module at any given time;
   wherein the DMA mode detection module compares the unique identifier of the first DMA channel with a unique identifier from a previous request that was granted immediately before the first DMA channel grant; and if the unique identifiers match, then the DMA mode detection module increments a DMA counter value that maintains a count value for the DMA channel that has been consecutively granted access within a certain duration;
   wherein the DMA mode detection module compares the incremented DMA counter value with a pre-programmed threshold value; and if the incremented DMA counter value is at least equal to the pre-programmed threshold value and no other request from another DMA channel from among the plurality of DMA channels is pending, then the DMA mode detection module enables a single channel mode to transfer data for a certain duration; and during the single channel mode, standard transaction rules are ignored to determine DMA request lengths to transfer the data; and wherein the single channel mode is disabled when the DMA mode detection module detects a pending DMA request from another DMA channel besides the first DMA channel that was not granted access to the bus within the certain duration.

15. The host computing system of claim 14, wherein the DMA mode detection module includes a register that stores the pre-programmed threshold value and the threshold value is programmed using host bus adapter firmware.

16. The host computing system of claim 14, wherein the plurality of DMA channels include a DMA channel in a receive path of the host bus adapter.

17. The host computing system of claim 14, wherein the plurality of DMA channels include a DMA channel in a transmit path of the host bus adapter.

18. The host computing system of claim 14, wherein an auto-sensing mode for the DMA mode detection module is enabled and disabled by firmware code executed by the host bus adapter; and wherein during the auto-sensing mode, the DMA detection module detects when the first DMA channel is the only DMA channel from among the plurality of DMA channels that is granted access to the bus within the certain duration.

19. The host computing system of claim 14, wherein the host bus adapter includes a rule based segmentation logic that is disabled after detection of a single channel mode condition by the DMA mode detection module and the rule based segmentation logic is enabled when the DMA mode detection module detects if another DMA channel from among the plurality of DMA channels, besides the firs DMA channel, is requesting bus access.

20. A method for transferring data between a host computing system and a storage system via a host bus adapter ("HBA") coupled to a network, comprising:
   (a) arbitrating between a plurality of requests received from a plurality of direct memory access (DMA) channels; wherein each DMA channel is identified by a unique identifier and arbitration module arbitrates between the plurality of requests
   (b) granting a request received from a first DMA channel from among the plurality of DMA channels;
   (c) comparing the unique identifier of the first DMA channel with a unique identifier from a request that was granted immediately before the first DMA channel request is granted;
   (d) if the unique identifiers match in step (c), then incrementing a DMA counter that maintains a count of a number of times a DMA channel from among the plurality of DMA channels has been consecutively granted access within a certain duration;
   (e) comparing the incremented DMA counter value from step (d) with a programmed threshold value;
   (f) if the DMA counter value is at least equal to the programmed threshold value, then enabling a single channel mode; wherein during the single channel mode, standard transaction rules are ignored to determine DMA request lengths to transfer data between the host computing system and the storage device; and
   (g) transferring data in the single channel mode until a DMA mode detection module detects that another DMA channel, besides the first DMA channel, from among the plurality of DMA channels is requesting access to the bus.

21. The method of claim 20, wherein the DMA mode detection module during an auto-sensing mode detects if the first DMA channel is the only DMA channel from among the plurality of DMA channels that has been granted access to the bus within the certain duration.

22. The method of claim 21, wherein the auto-sensing mode is enabled and disabled by firmware code of the HBA.

23. The method of claim 21, wherein the HBA uses a rule based segmentation logic to segment data; and the rule based segmentation logic is disabled after detection of a single channel mode condition by the DMA mode detection module; and the rule based segmentation logic is enabled when the DMA mode detection module detects another DMA channel from among the plurality of DMA channels, besides the first DMA channel, is requesting bus access.

* * * * *

UNITED STATES PATENT AND TRADEMARK OFFICE
CERTIFICATE OF CORRECTION

PATENT NO. : 7,577,772 B2
APPLICATION NO. : 10/935919
DATED : August 18, 2009
INVENTOR(S) : Bradley S. Sonksen et al.

It is certified that error appears in the above-identified patent and that said Letters Patent is hereby corrected as shown below:

In column 8, line 4, in Claim 5, delete "1" and insert -- 1, --, therefor.

In column 8, line 15, in Claim 6, after "module" insert -- and --.

In column 8, line 44, in Claim 7, delete "pre-programed" and insert -- pre-programmed --, therefor.

In column 9, line 11, in Claim 13, delete "bit" and insert -- bus --, therefor.

In column 10, line 15, in Claim 19, delete "firs" and insert -- first --, therefor.

Signed and Sealed this

Tenth Day of August, 2010

David J. Kappos
*Director of the United States Patent and Trademark Office*